United States Patent
Zapf et al.

(10) Patent No.: US 12,524,015 B2
(45) Date of Patent: Jan. 13, 2026

(54) METHOD AND APPARATUS FOR PLANNING A PATH FOR A MOBILE OBJECT

(71) Applicant: Robert Bosch GmbH, Stuttgart (DE)

(72) Inventors: Marc Patrick Zapf, Shanghai (CN); William Wang, Shanghai (CN); Zhuoqi Zeng, Shanghai (CN); Hao Sun, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 206 days.

(21) Appl. No.: 18/044,341

(22) PCT Filed: Sep. 14, 2020

(86) PCT No.: PCT/CN2020/115042
§ 371 (c)(1),
(2) Date: Mar. 7, 2023

(87) PCT Pub. No.: WO2022/052100
PCT Pub. Date: Mar. 17, 2022

(65) Prior Publication Data
US 2023/0333569 A1    Oct. 19, 2023

(51) Int. Cl.
*G05D 1/00* (2024.01)

(52) U.S. Cl.
CPC ......... *G05D 1/0274* (2013.01); *G05D 1/0238* (2013.01)

(58) Field of Classification Search
CPC .. G05D 1/0274; G05D 1/0238; G05D 1/0217; G05D 1/69; G05D 2107/70;
(Continued)

(56) References Cited

U.S. PATENT DOCUMENTS 11,016,491 B1 *  5/2021  Millard ................. G06N 3/045
11,089,432 B2 *  8/2021  Sundaresan ............ H04W 4/02
(Continued)

FOREIGN PATENT DOCUMENTS

CN    109425352 A    3/2019
CN    110068343 A    7/2019
(Continued)

OTHER PUBLICATIONS

Translation of CN111469127A retrieved from Espacenet on Oct. 10, 2024 (Year: 2024).*
(Continued)

*Primary Examiner* — Fadey S. Jabr
*Assistant Examiner* — Faris Asim Shaikh
(74) *Attorney, Agent, or Firm* — Maginot, Moore & Beck LLP

(57) ABSTRACT

A method for planning a path for a mobile object is disclosed. The method includes: generating a plurality of costmap layers based at least on locations of the obstacles in a navigation area, current locations and/or current planned paths of other mobile objects in the navigation area, and historical locations of other mobile objects in the navigation area; generating a master costmap based on the plurality of costmap layers; and planning a path to a target location based on the master costmap. An apparatus for planning a path for a mobile object is also disclosed. A controller for a mobile object, a mobile object and a computer-readable storage medium are also disclosed.

12 Claims, 2 Drawing Sheets

(58) Field of Classification Search
CPC ...... G01C 21/3453; G08G 1/20; G08G 1/161; G08G 1/22; H04W 4/44; H04W 4/46
See application file for complete search history.

(56) References Cited

U.S. PATENT DOCUMENTS

| | | |
|---|---|---|
| 2006/0241827 A1 | 10/2006 | Fukuchi et al. |
| 2012/0008831 A1* | 1/2012 | Tanigawa ............. G01B 11/002 382/103 |
| 2012/0219183 A1* | 8/2012 | Mori ..................... G06T 7/20 382/103 |
| 2017/0344007 A1 | 11/2017 | Song et al. |
| 2017/0357267 A1* | 12/2017 | Foster .................. G01C 21/005 |
| 2018/0017406 A1* | 1/2018 | Semnani .............. G01C 21/206 |
| 2018/0157916 A1* | 6/2018 | Doumbouya ........ G06V 40/103 |
| 2019/0016339 A1* | 1/2019 | Ishioka ............. B60W 30/0956 |
| 2019/0113927 A1* | 4/2019 | Englard ................ G06F 16/285 |
| 2019/0227562 A1 | 7/2019 | Mohammadiha et al. |
| 2020/0223432 A1* | 7/2020 | Yokoi ............... B60W 30/0956 |
| 2020/0284883 A1* | 9/2020 | Ferreira .............. H04N 25/773 |
| 2020/0346662 A1* | 11/2020 | Suzuki ............ B60W 60/00276 |
| 2021/0039671 A1* | 2/2021 | Kim .................... G06V 20/588 |
| 2021/0150196 A1* | 5/2021 | Yonetani ............. G06V 40/103 |
| 2021/0223777 A1* | 7/2021 | Nigam ................ G05D 1/0274 |
| 2021/0247205 A1* | 8/2021 | Szilágyi ................ G08G 1/164 |
| 2021/0278851 A1* | 9/2021 | Van der Merwe ... G06V 10/764 |
| 2022/0067605 A1* | 3/2022 | Zhang ............. G06Q 10/06311 |
| 2022/0343241 A1* | 10/2022 | Jha ........................ G08G 1/166 |
| 2023/0095898 A1* | 3/2023 | Borges .............. G01C 21/3407 701/25 |
| 2023/0377460 A1* | 11/2023 | Sivanesan ............. G08G 1/143 |

FOREIGN PATENT DOCUMENTS

| | | | | |
|---|---|---|---|---|
| CN | 111391823 A | | 7/2020 | |
| CN | 111469127 A | * | 7/2020 | ............ B25J 9/1664 |

OTHER PUBLICATIONS

International Search Report corresponding to PCT Application No. PCT/CN2020/115042, mailed May 26, 2021 (English language document) (4 pages).

* cited by examiner

METHOD AND APPARATUS FOR PLANNING A PATH FOR A MOBILE OBJECT

This application is a 35 U.S.C. § 371 National Stage Application of PCT/CN2020/115042, filed on Sep. 14, 2020, the disclosure of which is incorporated herein by reference in its entirety.

The disclosure mainly relates to a method and an apparatus for planning a path for a mobile object. The disclosure also relates to a controller of the mobile object. The disclosure also relates to a mobile object comprising the apparatus or the controller. The disclosure also relates to a computer-readable storage medium.

BACKGROUND

Currently, path planning for autonomous navigation typically relies on data of the on-board sensors (e.g., ultrasonic sensors, radars, cameras, LiDARs, etc.). The global path planner could plan a shortest global path based on a static map of the environment. Then, during navigation, the local path planner continuously adjusts the initially planned path in the event that the on-board sensors detect obstacles in the initially planned path. If there are a plurality of stationary or dynamic obstacles in the initially planned path, the global path planned by the global path planner may be far from an optimal path.

At present, the traffic flow could be improved by analyzing the location information of the mobile objects in an environment based on a ultra-wideband (UWB) system. However, the present solutions only consider the current locations of the mobile objects. In particular, in the case of navigation in a larger environment, a long path must be planned. In this situation, the current traffic situation at a remote location may differ from the traffic situation when the mobile object arrives at the remote location.

SUMMARY

The disclosure is aimed at providing a method for planning a path for a mobile object and an apparatus for planning a path for a mobile object. The method and the apparatus for planning a path for the mobile object are mainly based on a layered costmap and could achieve an optimal navigation path to the target location.

According to one aspect of the disclosure, a method for planning a path for a mobile object or a method of autonomous navigation of a mobile object is disclosed. The method comprises: generating a plurality of costmap layers based at least on locations of obstacles in a navigation area, current locations and/or current planned paths of other mobile objects in the navigation area, and historical locations of the other mobile objects in the navigation area; generating a master costmap based on the plurality of costmap layers; planning a path to a target location based on the master costmap.

The technical solution according to the disclosure is based particularly on the following considerations. Generally, there are not only stationary or dynamic obstacles but also a plurality of mobile objects in the navigation area. For example, in an industrial area, in addition to stationary machinery, there are often a plurality of mobile objects, such as transport vehicles, robots or persons, etc., wherein the mobile objects may be intelligent (for example artificial intelligence agents) or unintelligent. In this case, when planning an optimal path for navigating one mobile object from the start location to the target location, it is necessary to avoid collision with not only obstacles but also other mobile objects. Furthermore, if the other mobile objects comprise a path planning module and a communication module, it is possible to know their current planned paths and take them into account when planning the path. Additionally or alternatively, the path planning of the mobile objects could be determined with the aid of their historical locations or historical movement patterns (for example, when the mobile objects comprise no path planning modules or communication modules).

According to an embodiment of the method, a first costmap layer may be generated based on a static map of the navigation area. A second costmap layer may be generated based on the current locations of the obstacles detected by the mobile object during the navigation. A third costmap layer may be generated based on the current locations and/or the current planned paths of the other mobile objects. A fourth costmap layer may be generated based on historical locations of the other mobile objects over a predefined time period. Then, a master costmap may be generated based on the first costmap layer, the second costmap layer, the third costmap layer and the fourth costmap layer, or the first costmap layer, the second costmap layer, the third costmap layer and the fourth costmap layer may be integrated into a master costmap. Each costmap layer may be basically a grid cell map. The cost values of each costmap layer may be added up or averaged (especially with assigned weight values), to produce the master costmap. The first costmap layer, the second costmap layer, the third costmap layer, and the fourth costmap layer (and other possible costmap layers) are all in the same cost coordinate frame.

According to an embodiment of the method, the static map of the navigation area may be pre-built.

According to an embodiment of the method, the current locations of the obstacles in the navigation area are detected by one or more on-board sensors of the mobile object during navigation. The on-board sensors could be selected from the following group: ultrasonic sensor, radar, LiDAR or camera or any other type of sensors. The mobile object could detect/determine the locations of obstacles in the navigation area, in particular dynamically, by means of one on-board sensor or a sensor network of on-board sensors.

According to an embodiment of the method, the current locations and/or the current planned paths of the other mobile objects in the navigation area may be obtained based on a UWB system. The UWB system may comprise, for example, at least one tag arranged on each mobile object and at least four base stations arranged at different locations in the navigation area. Furthermore, the UWB system may further comprise a control unit connected to each base station, wherein the control unit is configured to calculate the location information of the mobile objects based on signals received by each anchor from the tag by the Time of Flight method (ToF) or the Time Difference of Arrival method (TDoA). The calculated location information may be shared among the mobile objects via the UWB channel, using UWB protocol, so that one mobile object may know the current locations of the other mobile objects. In addition, if the mobile objects comprise path planning modules, their current planned paths may also be shared among the mobile objects by means of the UWB system.

According to an embodiment of the method, a density map may be generated based on historical locations of the other mobile objects over the predefined time period, and the fourth costmap layer may be generated based on the density map. The density map represents, in particular in form of a density distribution, a historical movement patterns of the mobile objects over the predefined time period. For a given grid cell, the more frequently the mobile objects passed the grid cell over the predefined time period, the higher the density value of the grid cell is. In particular, grid cells with relatively high density values are assigned relatively high cost values.

In particular, the starting time and/or the length of the predefined time period may be adjusted in specific application scenarios.

According to an embodiment of the method, the (fourth) costmap layer may be generated based on not only the historical locations of other mobile objects over a predefined time period but also the historical locations of obstacles in the navigation area over a predefined time period. It would be highly advantageous in the event of dynamic obstacles. In addition, the fourth costmap layer may be generated also based on other information, which may be useful for the path planning.

According to an embodiment of the method, different costmap layers may be generated based on different types of the other mobile objects. For example, only the historical locations of robots or vehicles over a predefined time period are taken into account when generating the fourth costmap layer. Additionally, a fifth costmap layer may be generated based on historical locations of persons over a predefined time period, and a master costmap may be generated based on the first costmap layer, the second costmap layer, the third costmap layer, the fourth costmap layer and the fifth costmap layer accordingly. A similar situation applies to the third costmap layer.

According to an embodiment of the method, the costmap layers may be assigned, especially different, weight values when generating the master costmap. In specific application scenarios, the information of different costmap layers may be considered to varying degrees by adjusting the weight value of each costmap layer.

According to an embodiment of the method, the third costmap layer representing the current locations and/or current planned paths of the other mobile objects may be assigned a higher weight value than the fourth costmap layer representing the historical locations of the other mobile objects over a predefined time period. It would be highly advantageous in the event that the mobile objects are able to share their current planned paths.

According to an embodiment of the method, the fourth costmap layer representing the historical locations of the other mobile objects over a predefined time period may be assigned a higher weight value than the third costmap layer representing the current locations and/or the current planned paths of the other mobile objects. It would be highly advantageous in the event that most other mobile objects cannot share their current planned paths.

According to an embodiment of the method, the fifth costmap layer representing the historical locations of the persons over a predefined time period may be assigned a higher weight value than the fourth costmap layer representing the historical locations of mobile robots or vehicles over a predefined time period. In such a situation, persons could be better protected.

According to another aspect of the disclosure, an apparatus for planning a path for a mobile object or an apparatus of autonomous navigation of a mobile object is disclosed. The apparatus at least comprises a costmap layer generation module, a master costmap generation module and a path planning module. The costmap layer generation module may be configured to generate a plurality of costmap layers based at least on locations of obstacles in a navigation area, current locations and/or current planned paths of other mobile objects in the navigation area, and historical locations of the other mobile objects in the navigation area. The master costmap generation module may be configured to generate a master costmap based on the plurality of costmap layers. The path planning module may be configured to plan a path to a target location based on the master costmap.

According to an embodiment of the apparatus, the costmap layer generation module may be further configured to: generate a first costmap layer based on a static map of the navigation area; generate a second costmap layer based on the current locations of the obstacles detected by the mobile object during navigation; generate a third costmap layer based on the current locations and/or the current planned paths of the other mobile objects; and generate a fourth costmap layer based on the historical locations of the other mobile objects over a predefined time period. Accordingly, the master costmap generation module may be further configured to generate a master costmap based on the first costmap layer, the second costmap layer, the third costmap layer and the fourth costmap layer, or to integrate the first costmap layer, the second costmap layer, the third costmap layer and the fourth costmap layer into the master costmap. The first costmap layer, the second costmap layer, the third costmap layer and the fourth costmap layer (and other possible costmap layers) are all in the same cost coordinate frame. Each costmap layer may be basically a grid cell map. The cost values of each costmap layer may be added up or averaged, to produce the master costmap.

According to an embodiment of the apparatus, the static map of the navigation area may be pre-built.

According to an embodiment of the apparatus, the current locations of the obstacles in the navigation area may be detected by one or more on-board sensors of the mobile object during navigation. The on-board sensors may be selected from the following group: ultrasonic sensor, radar, LiDAR or camera or any other type of sensors. The mobile object could detect/determine the locations of obstacles in the navigation area, in particular dynamically, by means of one on-board sensor or a sensor network of on-board sensors.

According to an embodiment of the apparatus, the current locations and/or the current planned paths of the other mobile objects in the navigation area may be obtained based on a UWB system. The UWB system may comprise, for example, at least one tag arranged on each mobile object and at least four base stations arranged at different locations in the navigation area. Furthermore, the UWB system may further comprise a control unit connected to each base station, wherein the control unit is configured to calculate the location information of the mobile objects based on signals received by each anchor from the tag by the Time of Flight method (ToF) or the Time Difference of Arrival method (TDoA). The calculated location information may be shared among the mobile objects via the UWB channel, using UWB protocol, so that one mobile object may know the current locations of the other mobile objects. In addition, if the mobile objects comprise path planning modules, their current planned paths may also be shared among the mobile objects by means of the UWB system.

According to an embodiment of the apparatus, the costmap layer generation module may be further configured to generate a density map based on the historical locations of the other mobile objects over a predefined time period, and to generate the fourth costmap layer based on the density map. The density map represents, in particular in form of a density distribution, a historical movement patterns of the mobile objects over the predefined time period. For a given grid cell, the more frequently the mobile objects passed the grid cell over the predefined time period, the higher the density value of the grid cell is. Particularly, grid cells with relatively high density values may be assigned relatively high cost values.

In particular, the starting time and/or the length of the predefined time period may be adjusted in specific application scenarios.

According to an embodiment of the apparatus, the costmap layer generation module may be configured to generate the fourth costmap layer based on not only the historical locations of the other mobile objects over a predefined time period but also the historical locations of obstacles in the navigation area over a predefined time period. It would be highly advantageous in the event of dynamic obstacles.

According to an embodiment of the apparatus, the costmap layer generation module may be configured to generate different costmap layers based on different types of the other mobile objects. For example, the costmap layer generation module may be configured to generate the fourth costmap layer only based on the historical locations of robots or vehicles over a predetermined period of time. Additionally, the costmap layer generation module may be further configured to generate a fifth costmap layer based on the historical locations of persons over a predefined time period. Accordingly, the master costmap generation module may be configured to generate a master costmap based on the first costmap layer, the second costmap layer, the third costmap layer, the fourth costmap layer, and a fifth costmap layer. A similar situation applies to the third costmap layer.

According to an embodiment of the apparatus, the master costmap generation module may be configured to assign different weights to the costmap layers when generating the master costmap.

According to an embodiment of the apparatus, the master costmap generation module may be configured to assign a higher weight value to the third costmap layer representing the current locations and/or current planned paths of the other mobile objects than the fourth costmap layer representing the historical locations of the other mobile objects over a predefined time period. It would be highly advantageous in the event that the mobile objects are able to share their current planned paths.

According to an embodiment of the apparatus, the master costmap generation module may be configured to assign a higher weight value to the fourth costmap layer representing the historical locations of the other mobile objects over a predefined time period than the third costmap layer representing the current locations and/or the current planned paths of the other mobile objects. It would be highly advantageous in the event that most other mobile objects are persons.

According to an embodiment of the apparatus, the master costmap generation module may be configured to assign a higher weight value to the fifth costmap layer representing the historical locations of the persons over a predefined time period than the fourth costmap layer representing the historical locations of mobile robots or vehicles over a predefined time period.

According to yet another aspect of the disclosure, a controller for a mobile object is disclosed. The controller may comprise a processor and a memory having stored thereon a computer program which, when being executed by the processor, carries out the steps of the above-described method.

According to yet another aspect of the disclosure, a mobile object is disclosed. The mobile object may comprise the above-described apparatus for planning a path for a mobile object and one or more on-board sensors.

According to an embodiment of the mobile object, the mobile object may further comprise at least one UWB tag.

According to yet another aspect of the disclosure, a computer-readable storage medium is disclosed. The computer-readable storage medium may have stored thereon a computer program, wherein the computer program, when executed by a processor, carries out the steps of the above-described method.

DETAILED DESCRIPTION

In the following detailed description, numerous specific details are set forth to provide a thorough understanding of the claimed subject matter. The claimed subject matter, however, may be practiced without these specific details. In some instances, methods, apparatuses, or systems that would be known by one of ordinary skill have not been described in detail so as not to obscure claimed subject matter.

Figure 1:
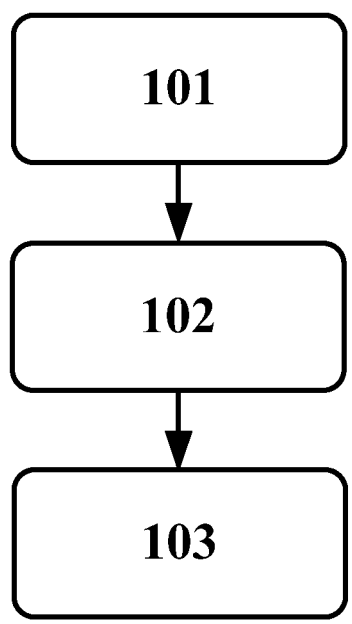
FIG. 1 schematically show a flow chart of a method for planning a path for a mobile object or a method of autonomous navigation of a mobile object according to an embodiment of the disclosure, FIG. 2 schematically shows a block diagram of an apparatus for planning a path for a mobile object or an apparatus of autonomous navigation of a mobile object according to an embodiment of the disclosure.

FIG. 1 shows a schematic flow chart of a method for planning a path for a mobile object or a method of autonomous navigation of a mobile object. The method is based on a costmap, in particular a layered costmap, and could achieve an optimal navigation path to the target location.

In step 101, a plurality of costmap layers are generated based at least on the locations of obstacles in a navigation area, the current locations and/or the current planned paths of other mobile objects in the navigation area and the historical locations of the other mobile objects in the navigation area.

In particular, a first costmap layer is generated based on a static map of the navigation area. A second costmap layer is generated based on the current locations of the obstacles detected by the mobile object during navigation. A third costmap layer is generated based on the current locations and/or the current planned paths of the other mobile objects. A fourth costmap layer is generated based on the historical locations of the other mobile objects over a predefined time period. Then, a master costmap is generated based on the first costmap layer, the second costmap layer, the third costmap layer and the fourth costmap layer, or the first costmap layer, the second costmap layer, the third costmap layer and the fourth costmap layer are integrated into a master costmap.

In particular, the first costmap layer, the second costmap layer, the third costmap layer and the fourth costmap layer (and other possible costmap layers) are all in the same cost coordinate frame. Each costmap layer may be basically a grid cell map. Each grid cell of the costmap layers describes the probability that the respective coordinate location in the environment is occupied.

In particular, the static map of the navigation area is pre-built.

In particular, the current locations of the obstacles in the navigation area are detected by one or more on-board sensors of the mobile object during navigation. The on-board sensors could be selected from the following group: ultrasonic sensor, radar, LiDAR or camera or any other type of sensors. The mobile object could detect/determine the locations of obstacles in the navigation area, in particular dynamically, by means of one on-board sensor or a sensor network of on-board sensors.

In particular, the current locations and/or the current planned paths of the other mobile objects in the navigation area could be obtained based on a UWB system. The UWB system may comprise, for example, at least one tag arranged on each mobile object and at least four base stations arranged at different locations in the navigation area. Furthermore, the UWB system may further comprise a control unit connected to each base station, wherein the control unit is configured to calculate the location information of the mobile objects based on signals received by each anchor from the tag by the Time of Flight method (ToF) or the Time Difference of Arrival method (TDoA). The calculated location information may be shared among the mobile objects via the UWB channel, using UWB protocol, so that one mobile object may know the current locations of the other mobile objects. In addition, if the mobile objects comprise path planning modules, their current planned paths may also be shared among the mobile objects by means of the UWB system.

In particular, a density map is generated based on historical locations of the other mobile objects over the predefined time period, and the fourth costmap layer is generated based on the density map. The density map represents, in particular in form of a density distribution, a historical movement patterns of the mobile objects over the predefined time period. For a given grid cell, the more frequently the mobile objects passed the grid cell over the predefined time period, the higher the density value of the grid cell is. Particularly, grid cells with relatively high density values are assigned relatively high cost values.

For example, the density value of a grip cell of the density map d(cell) could be calculated (e.g. in the range [0.0,1.0]) and especially continuously updated, by normalizing the number of historical locations of the other mobile objects (and/or obstacle detections) over the predefined time period assigned to the given grid cell $n_{detected}(cell)$ by the number of times the grid cell has been sampled (e.g. sampling rate=1/s or higher) $n_{sampled}(cell)$: $d(cell)=n_{detected}(cell)/n_{sampled}(cell)$. In order to obtain a costmap layer, the information of the grid cells of the density map could be interpreted as "cost" of the mobile object moving through the respective grid cells. According to one embodiment, the density map could be used directly as costmap layer.

In particular, the starting time and/or the length of the predefined time period may be adjusted in specific application scenarios.

Alternatively, the (fourth) costmap layer is generated based on not only the historical locations of other mobile objects over a predefined time period but also the historical locations of obstacles in the navigation area within a predefined time period.

Alternatively, different costmap layers are generated based on different types of the other mobile objects. For example, only the historical locations of robots or vehicles over a predefined time period are taken into account when generating the fourth costmap layer. Additionally, a fifth costmap layer is generated based on historical locations of persons over a predefined time period, and a master costmap is generated based on the first costmap layer, the second costmap layer, the third costmap layer, the fourth costmap layer and the fifth costmap layer accordingly. A similar situation applies to the third costmap layer.

In step 102, a master costmap is generated based on the plurality of costmap layers.

In particular, the costmap layers are assigned, especially different, weight values when generating the master costmap. In specific application scenarios, the information of different costmap layers could be considered to varying degrees by adjusting the weight values of each costmap layer.

For example, the third costmap layer representing the current locations and/or current planned paths of the other mobile objects is assigned a higher weight value than the fourth costmap layer representing the historical locations of the other mobile objects over a predefined time period. It would be highly advantageous in the event that the mobile objects are able to share their current planned paths.

For example, the fourth costmap layer representing the historical locations of the other mobile objects over a predefined time period is assigned a higher weight value than the third costmap layer representing the current locations and/or the current planned paths of the other mobile objects. It would be highly advantageous in the event that most other mobile objects are persons.

For example, the fifth costmap layer representing the historical locations of the persons over a predefined time period is assigned a higher weight value than the fourth costmap layer representing the historical locations of mobile robots or vehicles over a predefined time period.

In step 103, a path to the target location is planned based on the master costmap.

The path planning could be carried out based on the master costmap by means of classical path planning methods.

Figure 2:
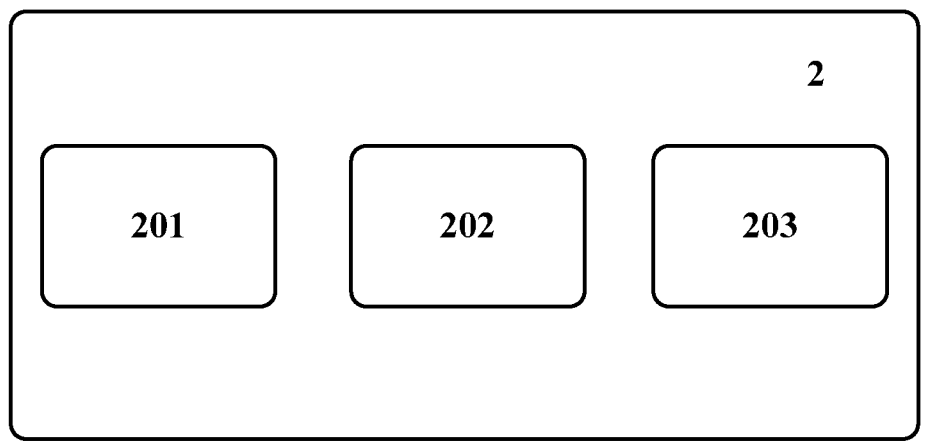

FIG. 2 shows a schematic block diagram of an apparatus for planning a path for a mobile object or an apparatus of autonomous navigation of a mobile object according to an embodiment of the disclosure.

According to the disclosure, the apparatus 2 at least comprises a costmap layer generation module 201, a master costmap generation module 202 and a path planning module 203.

The costmap layer generation module 201 is configured to generate a plurality of costmap layers based at least on locations of obstacles in a navigation area, current locations and/or current planned paths of other mobile objects in the navigation area, and historical locations of the other mobile objects in the navigation area.

The master costmap generation module 202 is configured to generate a master costmap based on the plurality of costmap layers.

The path planning module 203 is configured to plan a path to a target location based on the master costmap.

In particular, the costmap layer generation module 201 is further configured to: generate a first costmap layer based on a static map of the navigation area; generate a second costmap layer based on the current locations of the obstacles detected by the mobile object during navigation; generate a third costmap layer based on the current locations and/or the current planned paths of the other mobile objects; and generate a fourth costmap layer based on the historical locations of the other mobile objects over a predefined time period. Accordingly, the master costmap generation module 202 is further configured to generate a master costmap based on the first costmap layer, the second costmap layer, the third costmap layer and the fourth costmap layer, or to integrate the first costmap layer, the second costmap layer, the third costmap layer and the fourth costmap layer into the master costmap. The first costmap layer, the second costmap layer, the third costmap layer and the fourth costmap layer (and other possible costmap layers) are all in the same cost coordinate frame.

In particular, the static map of the navigation area is pre-built.

In particular, the current locations of the obstacles in the navigation area are detected by one or more on-board sensors of the mobile object during navigation. The on-board sensors could be selected from the following group: ultrasonic sensor, radar, LiDAR or camera or any other type of sensors. The mobile object could detect/determine the locations of obstacles in the navigation area, in particular dynamically, by means of one on-board sensor or a sensor network of on-board sensors.

In particular, the current locations and/or the current planned paths of the other mobile objects in the navigation area could be obtained based on a UWB system. The location information may be shared among the mobile objects via the UWB channel, using the UWB protocol, so that one mobile object may know the current locations of the other mobile objects. In addition, if the mobile objects comprise path planning modules, their current planned paths may also be shared among the mobile objects by means of the UWB system.

In particular, the costmap layer generation module 201 is further configured to generate a density map based on the historical locations of the other mobile objects over a predefined time period, and to generate the fourth costmap layer based on the density map. The density map represents, in particular in form of a density distribution, a historical movement patterns of the mobile objects over the predefined time period.

In particular, the starting time and/or the length of the predefined time period could be adjusted in specific application scenarios.

In particular, the costmap layer generation module 201 is configured to generate the fourth costmap layer based on not only the historical locations of the other mobile objects over a predefined time period but also the historical locations of obstacles in the navigation area over a predefined time period.

In particular, the costmap layer generation module 201 is configured to generate different costmap layers based on different types of the other mobile objects. For example, the costmap layer generation module 201 is configured to generate the fourth costmap layer only based on the historical locations of robots or vehicles over a predetermined period of time. Additionally, the costmap layer generation module 201 is further configured to generate a fifth costmap layer based on the historical locations of persons over a predefined time period. Accordingly, the master costmap generation module 202 is configured to generate a master costmap based on the first costmap layer, the second costmap layer, the third costmap layer, the fourth costmap layer, and a fifth costmap layer. A similar situation applies to the third costmap layer.

In particular, the master costmap generation module 202 is configured to assign different weights to the costmap layers when generating the master costmap.

For example, the master costmap generation module 202 is configured to assign a higher or lower weight value to the third costmap layer representing the current locations and/or current planned paths of the other mobile objects than the fourth costmap layer representing the historical locations of the other mobile objects over a predefined time period.

For example, the master costmap generation module 202 is configured to assign a higher weight value to the fifth costmap layer representing the historical locations of the persons over a predefined time period than the fourth costmap layer representing the historical locations of mobile robots or vehicles over a predefined time period.

While certain embodiments have been described, these embodiments have been presented by way of example only, and are not intended to limit the scope of the disclosure. The attached claims and their equivalents are intended to cover all the modifications, substitutions and changes as would fall within the scope and spirit of the disclosure.

The invention claimed is:

1. A method for planning a path for a mobile object and operating the mobile object, comprising:
    generating a plurality of costmap layers based at least on (i) locations of obstacles in a navigation area, (ii) current planned paths of other mobile objects in the navigation area, and (iii) historical locations of the other mobile objects in the navigation area;
    generating a master costmap based on the plurality of costmap layers;
    planning a path to a target location based on the master costmap; and
    operating the mobile object, based on the planned path, to navigate to the target location and to avoid the obstacles in the navigation area and the other mobile objects in the navigation area,
    wherein a first costmap layer of the plurality of costmap layers is generated based on a static map of the navigation area,
    wherein a second costmap layer of the plurality of costmap layers is generated based on current locations of obstacles detected by the mobile object during the navigation,
    wherein a third costmap layer of the plurality of costmap layers is generated based on current locations of the other mobile objects in the navigation area and the current planned paths of the other mobile objects,
    wherein a fourth costmap layer of the plurality of costmap layers is generated based on the historical locations of the other mobile objects over a predefined time period,
    wherein the costmap layers of the plurality of costmap layers are assigned different weight values when generating the master costmap,
    wherein (i) the third costmap layer is assigned a higher weight value than the fourth costmap layer when the other mobile objects are able to share their current planned paths, and (ii) the fourth costmap layer is assigned a higher weight value than the third costmap layer when the other mobile objects cannot share their current planned paths,
    wherein a density map is generated based on the historical locations of the other mobile objects over the predefined time period,
    wherein the fourth costmap layer is generated based on the density map, and
    wherein the density map is a density distribution representing historical movement patterns of the other mobile objects over the predefined time period.

2. The method of claim 1, wherein:
    the current locations of the obstacles are detected by one or more on-board sensors of the mobile object during navigation, and the one or more on-board sensors are selected from the following group: ultrasonic sensor; radar; LiDAR; and camera.

3. The method of claim 1, wherein the current locations of the other mobile objects and the current planned paths of the other mobile objects are obtained based on an ultra-wideband ("UWB") system.

4. A controller for a mobile object, comprising:
a processor; and
a non-transitory memory having stored thereon a computer program which, when executed by the processor, carries out the steps of the method of claim 1.

5. A non-transitory computer-readable storage medium having stored thereon a computer program, wherein:
the computer program, when executed by a processor, carries out the steps of the method of claim 1.

6. The method of claim 1, wherein a density value of a grid cell of the density map is calculated and continuously updated by normalizing a number of the historical locations of the other mobile objects over the predefined time period assigned to the grid cell by a number of times that the grid cell has been sampled.

7. An apparatus for planning a path for a mobile object and operating the mobile object, comprising:
a controller configured to implement:
a costmap layer generation module configured to generate a plurality of costmap layers based at least on (i) locations of obstacles in a navigation area, (ii) current planned paths of other mobile objects in the navigation area, and (iii) historical locations of the other mobile objects in the navigation area;
a master costmap generation module configured to generate a master costmap based on the plurality of costmap layers; and
a path planning module configured to plan a path to a target location based on the master costmap,
wherein the controller is configured to operate the mobile object, based on the planned path, to navigate to the target location and to avoid the obstacles in the navigation area and the other mobile objects in the navigation area,
wherein a first costmap layer of the plurality of costmap layers is generated based on a static map of the navigation area,
wherein a second costmap layer of the plurality of costmap layers is generated based on current locations of obstacles detected by the mobile object during the navigation,
wherein a third costmap layer of the plurality of costmap layers is generated based on current locations of the other mobile objects in the navigation area and the current planned paths of the other mobile objects,
wherein a fourth costmap layer of the plurality of costmap layers is generated based on the historical locations of the other mobile objects over a predefined time period,
wherein the costmap layers of the plurality of costmap layers are assigned different weight values when generating the master costmap,
wherein (i) the third costmap layer is assigned a higher weight value than the fourth costmap layer when the other mobile objects are able to share their current planned paths, and (ii) the fourth costmap layer is assigned a higher weight value than the third costmap layer when the other mobile objects cannot share their current planned paths,
wherein a density map is generated based on the historical locations of the other mobile objects over the predefined time period,
wherein the fourth costmap layer is generated based on the density map, and
wherein the density map is a density distribution representing historical movement patterns of the other mobile objects over the predefined time period.

8. The apparatus of claim 7, wherein:
the current locations of the obstacles are detected by one or more on-board sensors of the mobile object during navigation, and
the one or more on-board sensors are selected from the following group: ultrasonic sensor; radar; LiDAR; and camera.

9. The apparatus of claim 7, wherein the current locations of the other mobile objects and the current planned paths of the other mobile objects are obtained based on an ultra-wideband ("UWB") system.

10. A mobile object, comprising:
the apparatus for planning a path for a mobile object of claim 7 or the controller of claim 4; and
one or more on-board sensors.

11. The mobile object of claim 10, wherein the mobile object further comprises at least one ultra-wideband ("UWB") tag.

12. The apparatus of claim 7, wherein a density value of a grid cell of the density map is calculated and continuously updated by normalizing a number of the historical locations of the other mobile objects over the predefined time period assigned to the grid cell by a number of times that the grid cell has been sampled.

* * * * *